(12) United States Patent
Kajiwara

(10) Patent No.: US 8,274,865 B2
(45) Date of Patent: Sep. 25, 2012

(54) MASTER DISK FOR MAGNETIC RECORDING MEDIUM

(75) Inventor: Satomi Kajiwara, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 208 days.

(21) Appl. No.: 12/588,634

(22) Filed: Oct. 22, 2009

(65) Prior Publication Data

US 2010/0110844 A1    May 6, 2010

(30) Foreign Application Priority Data

Oct. 31, 2008  (JP) ................. 2008-281575

(51) Int. Cl.
*G11B 11/00* (2006.01)
*G11B 5/86* (2006.01)

(52) U.S. Cl. ...................... 369/13.02; 360/17

(58) Field of Classification Search ............... 369/13.31, 369/110.01, 13.02, 30.03; 360/16, 17, 75, 360/135; 428/800, 846; 264/427
See application file for complete search history.

(56) References Cited

U.S. PATENT DOCUMENTS

| 6,347,016 | B1 | 2/2002 | Ishida et al. | |
| 6,584,046 | B2 * | 6/2003 | Oshima et al. | 369/13.31 |
| 6,590,727 | B2 * | 7/2003 | Ishida et al. | 360/17 |
| 2002/0075583 | A1 | 6/2002 | Ishida et al. | |
| 2005/0111123 | A1 | 5/2005 | Sakaguchi et al. | |

* cited by examiner

*Primary Examiner* — Ali Neyzari
(74) *Attorney, Agent, or Firm* — Manabu Kanesaka

(57) ABSTRACT

A master disk for batch transferring of predetermined information recorded therein to a magnetic recording medium includes a substrate transmitting laser light, and convex portions provided on the substrate and formed of material reflecting or blocking the laser light. The convex portions have a pattern corresponding to the predetermined information.

7 Claims, 4 Drawing Sheets

MASTER DISK FOR MAGNETIC RECORDING MEDIUM

BACKGROUND OF THE INVENTION AND RELATED ART STATEMENT

The invention relates to a master disk for a magnetic recording medium.

After magnetic disks (also called "hard disks") used in the hard disk drives which have been rapidly widespread in recent years are delivered to disk drive manufacturers from magnetic disk manufacturers, before installation in disk drives, format information and address information are generally written onto the magnetic disks. This writing can be performed using magnetic heads. However, a method of batch transfer from a master disk on which such format information and address information have been written is more efficient, and is preferred.

As the batch transfer (magnetic printing) methods, generally, a magnetic transfer method employing magnetic properties is popular. In the magnetic transfer method, the master disk and a slave disk which is the transfer target disk are arranged to closely contact with each other, and an electromagnet device, permanent magnet device, or other magnetic field generating means is arranged on one side or on both sides to apply a magnetic field, so that a magnetization pattern corresponding to the servo signals and other information on the master disk is transferred all at once. In the magnetic transfer method, recording can be performed suitably without changing the relative positions of the master disk and slave disk. Moreover, there is an advantage that the time required for recording is extremely short. In particular, through recent progress in ultra-fine patterning technology, such as electron beam lithography techniques, signal patterning with minimum bit length of 100 nm or less has become possible, and batch writing of signals equivalent to the areal densities of current hard disk can now be performed using magnetic transfer.

In the past, various proposals of such magnetic transfer methods have been made. In the technology disclosed in Japanese Unexamined Patent Application Publication No. 10-40544: Patent Document 1, batch transfer is performed from a master disk on which a relief pattern comprising magnetic material is formed, corresponding to information written onto the surface of the substrate. In the technology disclosed in Japanese Unexamined Patent Application Publication No. 10-269566: Patent Document 2, closeness between the master disk and slave disk during magnetic transfer is improved. In the technology disclosed in Japanese Unexamined Patent Application Publication No. 2005-228462: Patent Document 3, by using laser light in irradiation through a master information carrier, where a pattern in shapes corresponding to servo signals or similar is formed on a translucent nonmagnetic substrate by arranging opaque ferromagnetic thin film, the coercivity is lowered in the portions irradiated with the laser light so as to perform magnetic transfer of servo signals or similar.

Here, a magnetic transfer method of the conventional art is explained, referring to FIGS. 1A-1C. FIG. 1B is a sectional view taken along a line 1B-1B in FIG. 1A. During magnetic transfer, a master disk 10 and a slave disk 30 are set as shown in FIG. 1C, the slave face 3 of the slave disk 30 is brought into contact with the protruding portions 2 formed by soft magnetic material on the master disk 10, and a prescribed pressing force is used to closely contact them each other.

Then, in the state in which the master disk 10 and slave disk 30 are in close contact, magnetic field generating means (not shown) is used to apply a magnetic field 5 in the direction shown in the figure, to perform batch transfer of the relief pattern of the master disk 10 onto the slave face 3 of the slave disk 30. Magnetic transfer by the master disk 10 may be performed to one face by bringing one face of the slave disk 30 into close contact with the master disk 10, or may be performed simultaneously to both faces, with a pair of master disks (not shown) brought into close contact with both faces of the slave disk 30. At the time of application of the magnetic field, the master disk 10 and slave disk 30 are integrally rotated. In addition to this method, the magnetic field generation means may be moved in rotation.

Next, a method for manufacturing a master disk of the conventional art is explained, referring to FIGS. 2A-2D. First, as shown in FIG. 2A, sputtering or another method is used to deposit soft magnetic material 2' (CoFe and the like) on a substrate 1 (silicon, glass, quartz, and the like) with a flat and clean surface. Then, an electron beam resist liquid is applied to form a resist film 7 by spin-coating. Then, using an electron beam exposure device (not shown) provided with a high-precision rotating stage or X-Y stage, the substrate 1 mounted on this stage is irradiated by an electron beam which is modulated corresponding to servo signals or other information, exposing the resist film 7 to the desired relief pattern. Then, development processing is performed to obtain the structure shown in FIG. 2B. Next, as shown in FIG. 2C, the patterned resist film 7 is used as a mask to perform RIE dry etching of the soft magnetic layer 2' using reactive gas and the like, or Ar gas is used to perform ion milling, or similar processing is performed to form protrusions 2 formed of the soft magnetic material. Finally, as shown in FIG. 2D, the resist film 7 is removed using oxygen plasma, resist stripping liquid, and the like. Through these processes, a master disk 10 can be manufactured in which protrusions 2 of soft magnetic material are formed, said protrusions 2 being arranged in a pattern corresponding to servo signals or other information.

However, in the technology disclosed in Patent Documents 1 and 2, the soft magnetic material used in protruding portions of the master disk is required to have a high saturation magnetic flux density, high permeability, low coercivity, and the like. Moreover, the shape should be rectangular as much as possible, and it is preferred that the thickness be of approximately the same dimension as the size of a bit. Hence, if material capable of meeting these requirements is selected, and if there is no technique for forming this material into fine shapes, a master disk with high transfer performance cannot be manufactured. Also, in order to further improve the contact of the master disk and slave disk (corresponding to the magnetic recording medium) and further improve transfer performance, if methods such as applying pressure for close contact within a chamber structure as well as reducing the pressure, and the like are used, there is a problem that the magnetic field necessary to magnetize the slave disk must pass through the chamber, so that the distance is increased, and magnets capable of generating very strong magnetic fields become necessary.

In the technology disclosed in Patent Document 3, when manufacturing a master disk, just as in the conventional art, there is the preeminent problem that ferromagnetic material optimized for magnetic transfer must be selected and processed.

The invention has been made in light of the above problems, and has a first object to provide a master disk, which can be manufactured more easily than the conventional art, and which realizes easy batch transfer compared with the magnetic transfer.

A second object of the invention is to provide a method for manufacturing a magnetic recording medium using the master disk of this invention.

Further objects and advantages of the invention will be apparent from the following description of the invention.

SUMMARY OF THE INVENTION

In order to attain these objects, in a first aspect of the invention, a master disk for batch transfer of information determined in advance onto a magnetic recording medium comprises a substrate which transmits laser light, and convex portions on the substrate. The convex portions are formed of material which reflects or blocks the laser light. The convex portions are arranged on the substrate in a pattern corresponding to the information determined in advance.

Further, with respect to a second aspect of the invention, the convex portions according to the first aspect are formed of a metal thin film having a high reflectivity with respect to the laser light compared with a magnetic film.

Further, in a third aspect of the invention, the metal thin film according to the second aspect is made of aluminum.

Further, in a fourth aspect of the invention, the substrate according to any one of the first to third aspects is formed of glass having a high transmissivity for the laser light compared with the metal thin film of the convex portions.

Further, a fifth aspect of the invention is a method for manufacturing a magnetic recording medium in which recorded information is determined in advance. The method comprises a step of bringing a magnetic recording face of the magnetic recording medium into close contact with a master disk, and a step of irradiating the magnetic recording face with laser light through the master disk to perform batch transfer of the information determined in advance onto the magnetic recording face. The master disk has a substrate which transmits the laser light, and convex portions provided on the substrate and formed of material which reflects or blocks the laser light. The convex portions are arranged on the substrate in a pattern corresponding to the information determined in advance.

In a master disk of this invention, since the master disk comprises a substrate which transmits laser light and convex portions formed on the substrate using material which reflects or blocks laser light, with the convex portions arranged on the substrate in a pattern corresponding to information determined in advance, a master disk can be manufactured easier than the conventional art, and batch transfer easier than the magnetic transfer can be realized.

Further, by using a master disk of this invention, a method for manufacturing a magnetic recording medium can be provided so as to enable easier batch transfer compared with magnetic transfer.

DETAILED DESCRIPTION OF PREFERRED EMBODIMENTS

Figure 1A:
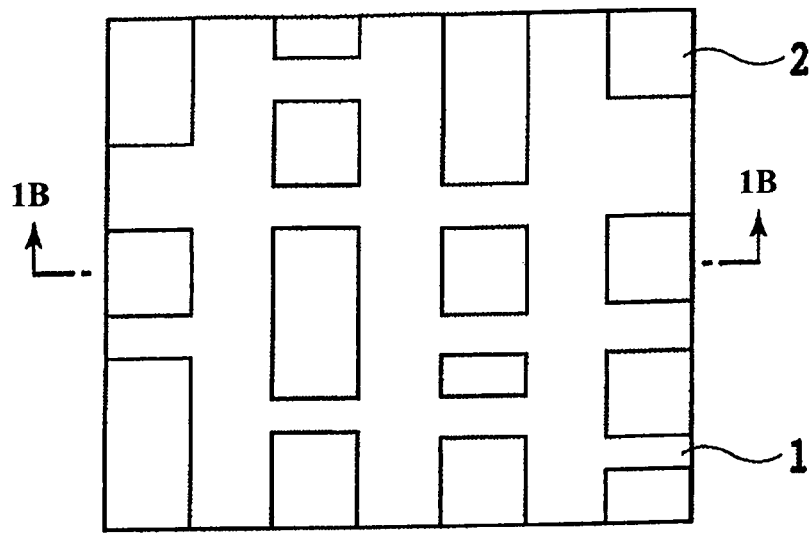
FIGS. 1A to 1C explain a magnetic transfer method of the conventional art.
Figure 1B:
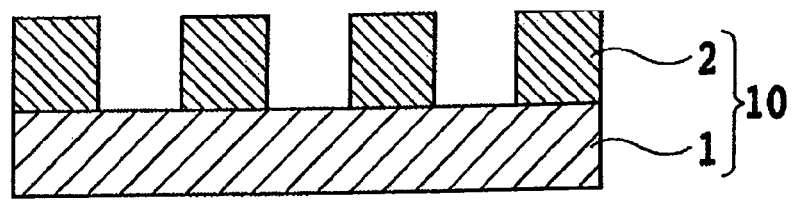
Figure 1C:
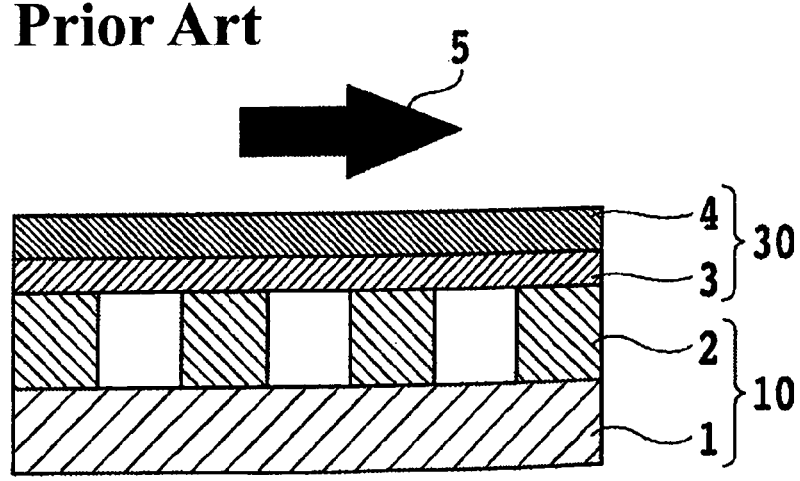
Figure 2A:
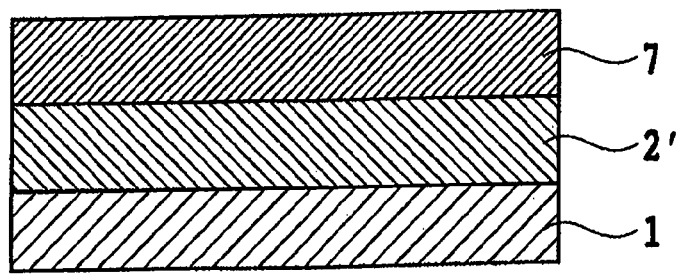
FIGS. 2A to 2D show a method for manufacturing a master disk of the conventional art.
Figure 2B:
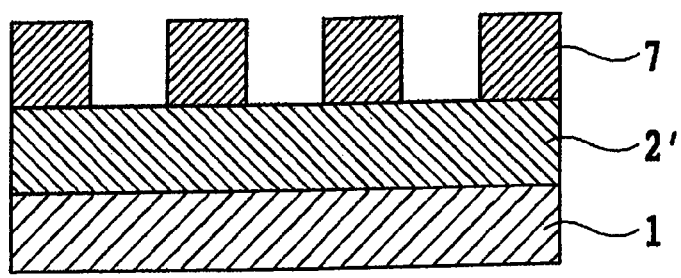
Figure 2C:
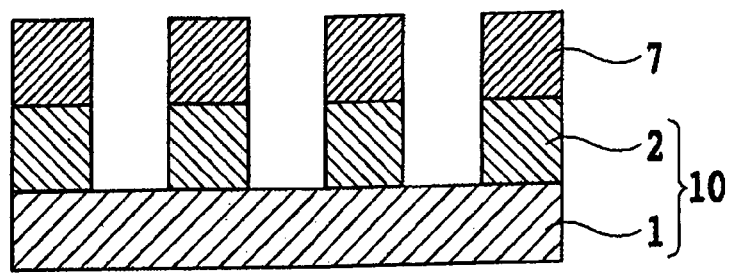
Figure 2D:
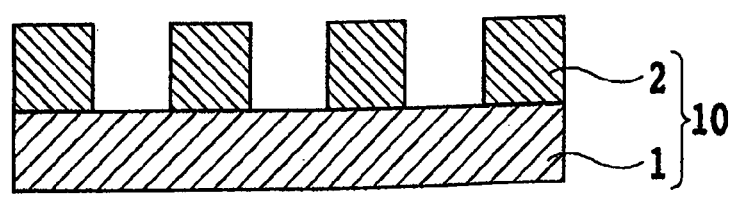

Below, preferred embodiments of the invention are explained in detail, referring to the drawings.

Figure 3A:
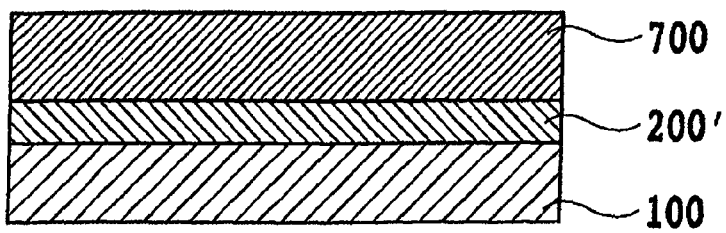
FIGS. 3A to 3D show a method for manufacturing a master disk of the invention.
Figure 3B:
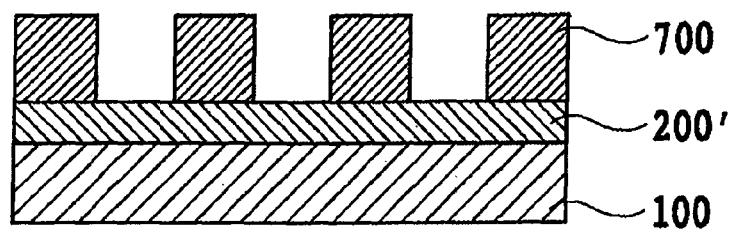

FIGS. 3A to 3D show a method for manufacturing master disks of this invention. As shown in FIG. 3A, sputtering or another method is used to deposit a material 200' (high-reflectivity aluminum or similar), which can reflect or block laser light, on a substrate 100 (glass, quartz, and the like) which transmits laser light. Then, an electron beam resist liquid is spin-coated or otherwise applied to form a resist film 700.

Then, an electron beam exposure device (not shown) provided with a high-precision rotating stage or X-Y stage is used to irradiate the substrate 100 mounted on the stage with an electron beam modulated corresponding to servo signals or other information, to expose the resist film 700 to a prescribed relief pattern. Then, development processing is performed to obtain the structure shown in FIG. 3B.

As the material 200', Al, AlSiO$_2$, AlNd, AlNdSiO$_2$, Ag, AgNd, AgBi (bismuth) alloy, and the like are suitable.

Figure 3C:
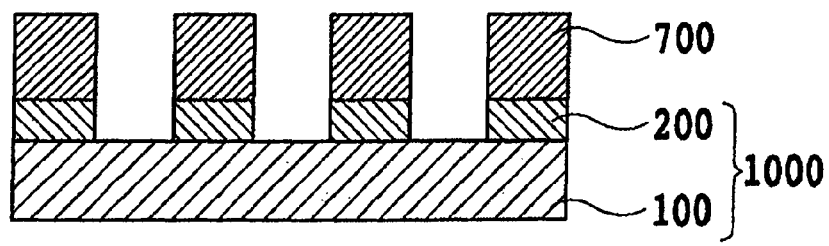

Next, as shown in FIG. 3C, the patterned resist film 700 is used as a mask to perform RIE dry etching by using a reactive gas and the like, or by ion milling using Ar gas and the like, of the material 200'.

Figure 3D:
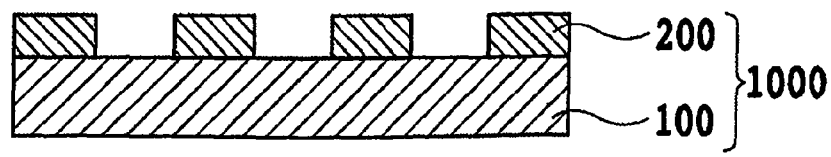

Finally, as shown in FIG. 3D, the resist film 700 is removed by using oxygen plasma, a resist stripping liquid, and the like.

Through these processes, a master disk 1000 can be manufactured. The resulting master disk comprises a substrate 100 which transmits laser light and convex portions 200 formed on the substrate 100 from material which reflects or blocks laser light, the convex portions 200 being arranged on the substrate 100 in a pattern corresponding to servo signals or other information determined in advance.

In this invention, metal processing technology (dry etching in an RIE device using reactive gas) used in semiconductors and other fields, use of which had been difficult due to characteristic changes in ferromagnetic materials (degradation of characteristics due to etching damage and corrosion), can be used, even though such use was difficult when manufacturing a master disk of the conventional art. Therefore, master disk manufacturing becomes extremely easy.

Figure 4A:
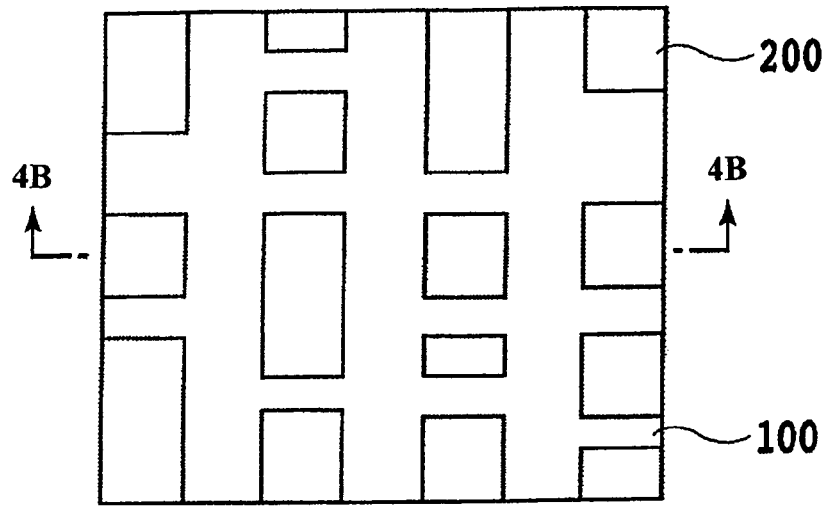
FIGS. 4A to 4C explain a method for manufacturing a magnetic recording medium using a master disk of the invention.
Figure 4B:
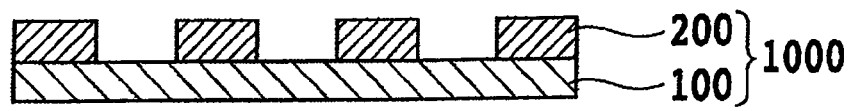
Figure 4C:
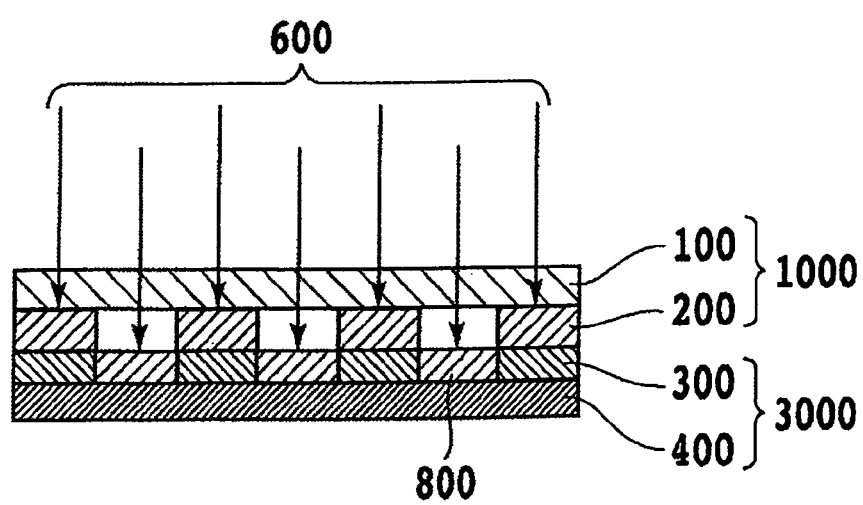

Here, a method for manufacturing a magnetic recording medium using a master disk of this invention is explained, referring to FIGS. 4A-4D. FIG. 4B is a sectional view taken along a line 4B-4B in FIG. 4A. At the time of transfer, the master disk 1000 and a slave disk 3000 are set as shown in FIG. 4C, the slave face 300 (corresponding to the magnetic recording face) of the slave disk 3000 (corresponding to the magnetic recording medium) is brought into contact with the convex portions 200 of the master disk 1000, and a prescribed pressing force is used to cause a close contact. Then, in the state of the close contact between the master disk 1000 and the slave disk 3000, by irradiating with laser light 600 using laser irradiation means (not shown), the irradiated portions 800 irradiated by the laser light 600 of the slave face 300 of the slave disk 3000 become substantially nonmagnetic. Hence, servo signal and other information corresponding to the convex portions 200 of the master disk 1000 are batch-transferred to the slave face 300 of the slave disk 3000. Here, the laser light 600 used in irradiation is laser light which can render the slave face 300 nonmagnetic by irradiation. For example, a YAG laser (wavelength 532 nm, pulse width 3 to 6 nsec, repeat rate 20 Hz, power 5 mJ) is used.

The slave disk 3000 is a slave disk substrate 400 having a slave face 300 which is a magnetic recording face.

During transfer to the slave disk 3000, there is no need to apply a magnetic field in a circumferential direction as opposed to the magnetic transfer. Therefore, the transfer device can have a simpler construction, and there is a further merit that the batch transfer can be performed easily.

The Disclosure of Japanese Patent Application No. 2008-281575 filed on Oct. 31, 2008 is incorporated in the application.

While the invention has been explained with reference to the specific embodiments of the invention, the explanation is illustrative and the invention is limited only by the appended claims.

What is claimed is:

1. A master disk for batch transferring of predetermined information recorded therein to a magnetic recording medium, comprising:
    a substrate transmitting laser light; and
    convex portions provided on the substrate and formed of material blocking the laser light, said convex portions having a pattern corresponding to the predetermined information.

2. The master disk according to claim 1, wherein the convex portions are formed of a metal thin film having a reflectivity with respect to the laser light higher than that of a magnetic film.

3. The master disk according to claim 2, wherein the metal thin film is made of aluminum.

4. The master disk according to claim 1, wherein the substrate is formed of glass having a transmissivity for the laser light higher than that of the metal thin film of the convex portions.

5. The master disk according to claim 2, wherein the metal thin film is made of a material selected from the group consisting of $AlSiO_2$, AlNd, $AlNdSiO_2$, Ag, AgNd, and AgBi alloy.

6. A master disk for batch transferring of predetermined information recorded therein to a magnetic recording medium, comprising:
    a substrate transmitting laser light; and
    convex portions provided on the substrate and formed of thin metal film blocking or reflecting the laser light, said convex portions having a pattern corresponding to the predetermined information so that when the laser light is irradiated on the master disk having the convex portions on the substrate, the laser light only passes through the substrate where the pattern of the convex portions is not formed.

7. The master disk according to claim 6, wherein the substrate is made of glass, and the thin metal film is made of a material selected from the group consisting of Al, $AlSiO_2$, AlNd, $AlNdSiO_2$, Ag, AgNd, and AgBi alloy.

* * * * *